Jan. 19, 1932.    E. G. DUDEN    1,842,153
FLUID PROPORTIONING APPARATUS
Filed May 5, 1930
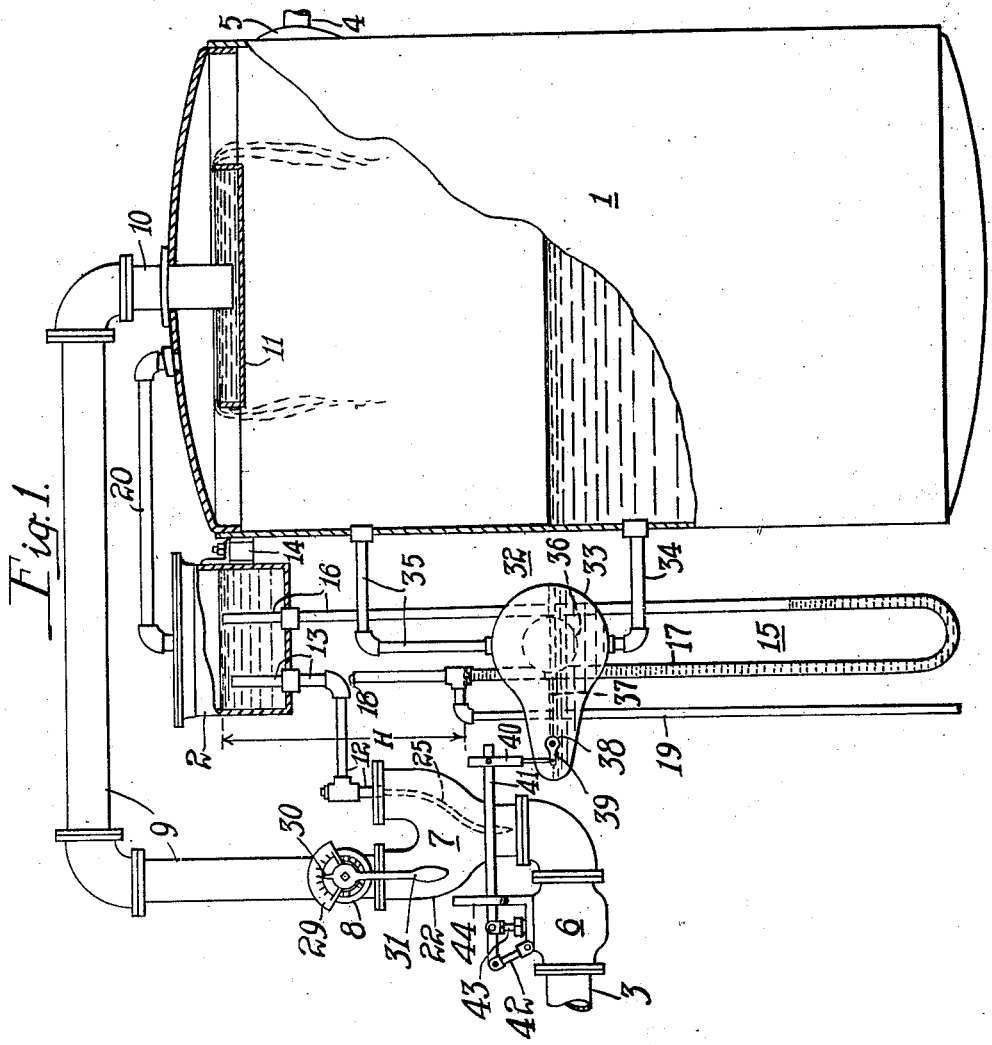
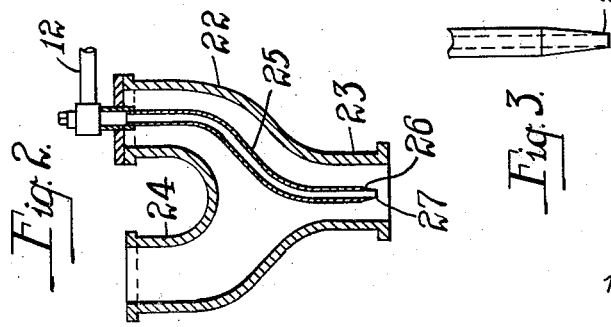
INVENTOR
Emil G. Duden
By Green & McCallister
His Attorneys Patented Jan. 19, 1932

1,842,153

UNITED STATES PATENT OFFICE

EMIL G. DUDEN, OF OAKMONT, PENNSYLVANIA, ASSIGNOR TO WM. B. SCAIFE & SONS COMPANY, OF OAKMONT, PENNSYLVANIA, A CORPORATION OF PENNSYLVANIA

FLUID PROPORTIONING APPARATUS

Application filed May 5, 1930. Serial No. 449,987.

This invention relates to devices for automatically dividing the flow of a liquid in a pipe line into a plurality of streams each flowing through a branch line, in such a manner that the volume of liquid flowing in one branch is always proportional to the volume of liquid flowing in another of the branches.

Heretofore attempts have been made to divide the flow of liquid, in a pipe line, by means of a pair of orifices discharging into two closed weir tanks in which the gas pressures are equalized and from which the liquid is discharged through weir notches. This type of device is only satisfactory when the proportion of the flows is of a one-to-one ratio; or in other words, when the flow is to be divided into two streams of equal volume.

In certain industrial processes such as water softening, the proportion of flows usually is of a 100-to-1 ratio and often rises as high as a 200-to-1 ratio. Under such conditions of proportioning, the orifice method of dividing the flow is entirely unsatisfactory and commercially inoperative since the high velocity head produced by the large orifice reduces the flow through the small orifice and the flows are not proportional because the ratio of the volume in one stream to the ratio in the other will vary with changes in the velocity head in the main leading to the orifices, and in some cases fluid may not flow at all through the small orifice.

An object of this invention is to provide a proportioning device having a high degree of accuracy so that it may fulfill the exacting requirements of the processes it supplies.

Another object of the invention is the provision of fluid proportioning apparatus that shall be entirely free of moving parts and actuated by an hydraulic and pneumatic balance of the various pressures to which such apparatus may be subjected.

A further object of the invention is to proportion the flow of a liquid in a pipe line into streams discharging into branch lines the volumes of which will bear a fixed ratio one to another regardless of the pressure variations in the main or flow line.

A still further object of the invention is the division of flow of a liquid in a pipe line or conduit into two separate and independent streams in response to the velocity head of the fluid in the main or flow line so that the ratio of the volume or rate of flow in one branch to the volume or rate of flow in the other branch shall be a substantially fixed value for all variations in operative pressures in the main or flow line.

Other objects of the invention will, in part, be apparent and will, in part, be obvious from the following description taken in conjunction with the accompanying drawings in which:

Figure 1 is a view in side elevation, partly in section, of apparatus embodying the invention;

Fig. 2 is a view in section of a liquid proportioning device embodied in the apparatus shown in Fig. 1;

Fig. 3 is a partial plan view of the intake end of a velocity or impact tube embodied in the proportioning apparatus; and Fig. 4 is an end view of the device shown in Fig. 3.

Throughout the drawings and the specification like parts are designated by similar reference characters.

In the drawings a main tank 1 and an auxiliary tank 2 are shown to which liquid is delivered from a supply line 3 in proportions bearing a substantially fixed ratio one to the other.

The liquid entering the main tank may be heated by exhaust steam entering through a conduit 4 and an oil separator 5 and discharging into the tank. The liquid discharging into the main tank flows from the main or flow line 3 controlled by a valve 6, through a proportioning device 7, an adjustable valve or cock 8 that acts as an adjustable orifice, through a main branch line 9 and pipe or conduit 10 leading into the tank through its top. The liquid discharging through the pipe or conduit 10 is collected in a distributing pan 11 located inside of the pressure or main tank 1. The end of the pipe 10 discharging into the distributing pan is submerged in the liquid in the pan in order to prevent the entrance of vapor or gases occasioned by the exhaust steam, into the branch 9 discharging into the distributing pan.

The auxiliary tank 2 receives liquid from the proportioning device 7 that flows through an auxiliary pipe line 12 and pipe or conduit 13 leading into the auxiliary tank through its bottom and discharging at a point above said bottom. The auxiliary tank 2 is mounted on the main tank as indicated at 14 and at such an elevation that the elevation of the liquid in the auxiliary tank is the same as the elevation of the liquid in the distributing pan disposed in the main tank.

The discharge of liquid from the auxiliary tank flows through a U-tube 15 one leg 16 of which extends through the bottom of the tank and to a point a predetermined distance above the bottom thereof.

Leg 17 of the U-tube is vented to the atmosphere at 18. The short leg 17 of the U-tube discharges through a pipe line 19 that supplies liquid to a device (not shown) for proportioning the volume of flow of reagents to the volume of liquid to be treated in the main tank. Since the short leg 17 of the U-tube is vented to the atmosphere, the discharge from the U-tube into the pipe line 19 will not siphon the liquid out of the auxiliary tank and thereby drain the same.

The back pressure of the vapor in the main tank which is also communicated to the auxiliary tank is balanced in the U-tube by the atmospheric pressure and the pressure due to the height of the column of liquid in pipe 17.

In order that the back pressure on the fluid in the auxiliary tank 2 may be equal to the back pressure on the liquid in the main tank 1 the auxiliary tank is connected at its top by a pipe line 20 communicating with the interior of the main tank through its top.

In practice, the branch line 9 leading from the proportioning device 7 and discharging into the main tank 1 and the auxiliary branch line 12 leading into the auxiliary tank are so designed that the friction head in the one line resulting from the flow of liquid therein will be equal to the friction head in the other; therefore, the net pressure acting on the proportioning device occasioned by the friction head through the branch lines leading to the main and auxiliary tanks will be substantially equal for all conditions of operation.

The proportioning device 7 is shown more particularly in Fig. 2 of the drawings and comprises a return bend fitting 22 of substantially Y-shape in section. The leg portion 23 of the return bend fittting where it connects to the main flow line 3 is of substantially the same flow area, that is the area in transverse section, as the flow area of the main flow line. The fluid discharging into the main branch line passes through the adjustable orifice or cock 8 from conduit portion 24 of the return bend fitting.

The liquid discharging into the auxiliary branch line 12 passes through a conduit, impact or velocity tube 25 disposed within the return bend fitting and having its up-stream end 26 disposed at a point removed from the adjustable or restricted orifice created by the adjustable valve or cock 8. In practice, the open end of this conduit is disposed at a point in the return bend fitting where the area thereof is equal to the flow area in the main flow line.

In order that no turbulence or eddy currents shall be set up at the up-stream end 26 of the conduit, velocity, or impact tube the up-stream end is sharpened to a knife edge 27 as shown more particularly in Figs. 3 and 4 of the drawings. The rate of flow of liquid through tube 25 is in proportion to the velocity head or the rate of flow of liquid in the main or branch line. Therefore, for any particular adjustment of the adjustable valve, the volume or rate of flow in the main branch line 9 and the volume or rate of flow through the auxiliary branch line 12 will always bear a fixed ratio one to the other and will always be proportional to the volume or rate of flow in the main flow line.

For example, if the adjustable valve is adjusted to a certain position, the ratio of the flow in the main branch line to the flow in the auxiliary branch line may be 100-to-1 or 200-to-1, depending upon the particular setting of the adjustable valve or cock 8. For any particular setting of the adjustable valve, the ratio of the flow in the branch lines will always remain substantially constant for all variations in pressure in the main or flow line as well as for all variations in back pressure existing in the main and auxiliary tanks.

Valve or cock 8 may be calibrated and provided with a graduated scale 29 that cooperates with an indicator 30 formed on the valve handle or lever 31.

In order that the rate of flow, that is the volumes of liquid delivered to the main and auxiliary tanks, may be adjusted to the rate at which fluid is withdrawn from the main tank, a controlling device 32 is provided for operating the valve 6. The valve 6 is so controlled by the regulating device 32 that for balanced conditions, the volume of liquid delivered to the branch lines from the main flow line will be equal to or substantially equal to the quantity of liquid withdrawn from the main tank 1.

The controlling device 32 comprises a hollow body, float box or housing 33, the lowermost portion of which communicates with the main tank through a conduit 34 attached to the main tank at a point below level of the liquid therein. The uppermost portion of the housing or body has communication with the tank 1 through a conduit 35 entering the main tank at a predetermined distance above the normal liquid level in the tank.

A float 36 is disposed within the housing or body and is mounted on a float arm 37 pivoted on a stub shaft 38. The stub shaft has a crank or lever 39 which is pivoted to a link 40. Link 40 is pivoted to a valve operating lever 41 fulcrumed at one end on a link 42 that is pivotally mounted on the body of the valve 6. Lever 41 is pivotally connected to the stem 43 of the valve so that as the arm is raised or lowered by the lever 41 the valve will be opened or closed according to the direction in which the float 36 is moving. The lever 41 is guided in a forked member 44.

The proportioning device described above is essentially a supply or flow pipe having two branches which divide the flow of liquid and discharge it into two pressure vessels; i. e., the main and auxiliary tanks are subjected to a back pressure occasioned by the exhaust steam employed for heating the liquid in the main tank. In each branch there is a contracted section materially smaller in area than the flow or cross-sectional area of the branch. This contracted section in the larger or main branch is the orifice in the adjustable valve or cock 8 and in the smaller branch it is the conduit impact or velocity head responsive tube 25, the flow area of tube 25 being smaller than the area of the branch line 12.

In order to obtain a proportional flow through these branches, it is necessary that the variable pressure fluctuations around the contracted sections, whether caused by a pressure change in the main supply or flow line or a pressure which is caused by a change in rate of flow or by pressure fluctuations of the gas or vapor in the main and auxiliary tanks, shall be simultaneously impressed on these contracted sections. The pressure fluctuations in the supply line are controlled by the valve 6 and the regulating device 32. As the pressure in the supply line increases, more liquid flows into the main tank than is required to supply the demand. Therefore, the liquid level in the tank 1 and in the float housing or body 33 will rise, whereby the float 36 will rise and cause the lever 41 to move downwardly. The valve 6 will then be closed or partially closed and reduce the rate of flow through the supply line 3. The valve 6 controlling the supply line is closed or partially closed until the amount of liquid it passes is equal to the demand imposed on the main tank. In like manner a drop in pressure in the supply line results in a lowering of the liquid level in the main tank 1 thereby causing the float to lower. The lowering of the float will cause the valve 6 to open wider and permit more liquid to flow through the main and auxiliary branch lines. The increased rate in flow in the main branch line will continue until a point is reached where the volume delivered by the main branch line to the main tank is equal to the volume withdrawn therefrom.

The pressure variations resulting from the changes in the rate of flow in the main supply line affect the up-stream ends of the contracted section at the valve or orifice 8 and the velocity head responsive tube 25. Since the velocity head of the liquid entering the return bend fitting 22 is impressed on the velocity tube 25 and the valve or cock 8 at the same point at the same time, the ratio of the volume or rate of flow in the main branch line to the rate or volume of flow in the auxiliary branch line will not be affected or changed.

Since the level of the liquid in the auxiliary tank is at the same point as the liquid level in the distributing pan in the main tank, the main and auxiliary branches are discharging or operating against discharge heads of equal value. Further since the pressure vessels, that is, the main and auxiliary tanks, are cross-connected through the equalizing line 20, the back pressures against which the main and auxiliary branches must operate are equal. It is, therefore, apparent that the liquid flowing in the auxiliary branch to the auxiliary tank will always be proportional to the rate of flow of liquid flowing through the main branch to the main tank, because the liquid flowing in each branch will be directly proportional or in response to the pressure or the velocity head in the main or supply line.

While various modifications and changes may be made in the fluid proportioning apparatus herein shown and described without departing from the spirit and scope of the invention, it is to be understood that only such limitations shall be placed on the invention as are imposed by the prior art and the appended claims.

What I claim as new and desire to secure by Letters Patent is:

1. Liquid proportioning apparatus comprising a closed chamber having therein a medium exerting back pressure, a second closed chamber, means for conducting liquid to said first chamber, means for conducting liquid from said liquid conducting means into said second chamber in proportion to the velocity head of liquid in said liquid conducting means, and means controlling the rate of flow of liquid in said liquid conducting means in response to variations in the liquid level in the first closed chamber.

2. In combination, a main tank, a conduit leading into said tank, a distributor for liquid disposed at the end of said conduit so as to submerge the same in the liquid being discharged therefrom, an auxiliary tank having communication at its top with the top of the main tank, a flow conduit communicating with said leading in conduit through an adjustable orifice, a conduit leading from the flow conduit to the auxiliary tank, and means for proportioning the flow to said tanks in accordance with the velocity head in the flow conduit.

3. In combination, a main tank, a conduit leading into said tank, a distributor for liquid disposed at the end of said conduit so as to submerge the same in the liquid being discharged therefrom, an auxiliary tank having communication at its top with the top of the main tank, a flow conduit communicating with said leading in conduit through an adjustable orifice, a conduit leading from the flow conduit to the auxiliary tank, means for proportioning the flow to said tanks in accordance with the velocity head in the flow conduit, and means for regulating the velocity head in the flow conduit in accordance with variations in the liquid level in the main tank.

4. In combination, a main tank, a conduit leading into said tank, a distributor for liquid disposed at the end of said conduit so as to submerge the same in the liquid being discharged therefrom, an auxiliary tank having vapor pressure communication with the main tank, a flow conduit communicating with said leading in conduit through an adjustable orifice, a conduit leading from the flow conduit to the auxiliary tank, and means for proportioning the flow to the auxiliary tank in proportion to the velocity head in the flow conduit at a point up-stream and removed from said adjustable orifice, whereby the flow to said auxiliary tank is always in fixed proportion to the flow to the main tank irrespective of variations in velocity head in the flow conduit.

5. In combination, a main tank, a conduit leading into said tank, a distributor for liquid disposed at the end of said conduit so as to submerge the same in the liquid being discharged therefrom, an auxiliary tank having pressure communication with the main tank, a flow conduit communicating with said leading-in-conduit through an adjustable orifice, a conduit leading from the flow conduit to the auxiliary tank, means for proportioning the flow to the auxiliary tank in proportion to the velocity head in the flow conduit at a point up-stream and removed from said adjustable orifice, whereby the flow to said auxiliary tank is always in fixed proportion to the flow to the main tank irrespective of variations in velocity head in the flow conduit, and means for varying the velocity head in said flow conduit in response to variations in the level of the liquid in said main tank.

6. Liquid proportioning apparatus arranged to operate against balanced but variable static liquid and friction head pressures and balanced vapor pressures, comprising a flow conduit of relative large area, and means in said conduit responsive to the velocity head of liquid flowing therethrough for dividing said flow into independent streams each proportional to the rate of flow in said conduit and bearing a fixed ratio one to another.

7. Liquid proportioning apparatus arranged to operate against balanced but variable static liquid and friction head pressures and balanced vapor pressures, comprising a flow conduit, and means in said conduit responsive to the velocity head of liquid flowing therethrough for dividing said flow into independent streams each proportional to the rate of flow in said conduit and bearing a fixed ratio one to another.

8. Liquid proportioning apparatus comprising a supply pipe terminating in at least two branch pipes, an orifice in each branch pipe, means exerting equal back pressures on both orifices, and a tube disposed within one of said branch pipes, said tube having its down-stream end connected to the orifice of said branch and its up-stream end disposed within the supply pipe.

9. Liquid proportioning apparatus comprising a supply pipe terminating in at least two branch pipes, an orifice in each branch pipe, at least one of said orifices being adjustable, means providing regions of equal pressures into which said branch pipes discharge, and means responsive to the velocity head in the supply pipe for maintaining substantially constant proportional rates of flow in said branch pipes.

10. Liquid proportioning apparatus comprising a supply pipe terminating in at least two branch pipes, an orifice in each branch pipe, means exerting equal back pressures on both orifices, and a tube disposed within one of said branch pipes, said tube having its down-stream end connected to the orifice of one of said pipes and its up-stream end disposed within the supply pipe at a point removed from the up-stream ends of said branch pipes.

11. Liquid proportioning apparatus comprising a supply pipe terminating in at least two branch pipes, an adjustable orifice in one of said branch pipes, a fixed orifice in the other of said branch pipes, means exerting equal back pressures on the discharge side of each of said orifices, and a tube open at both ends disposed within said pipes, said tube having its down-stream end connected to the fixed orifice and its up-stream end terminating in the supply pipe at a point where the flow therein is not disturbed by the flow in the branch line having the adjustable orifice therein.

12. In combination, a main tank, a conduit leading into said tank, a distributor for liquid disposed at the end of said conduit so as to submerge the same in the liquid being discharged therefrom, an auxiliary tank having communication at its top with the top of the main tank, a flow conduit communicating with said leading in conduit through an adjustable orifice, a conduit leading from the flow conduit to the auxiliary tank, means for proportioning the flow to said tanks in accordance with the velocity head in the flow conduit and means for maintaining the level of the liquid in said auxiliary tank substantially equal to the level of the liquid in said distributor.

13. The combination with a liquid supply pipe and a plurality of receptacles having equal pressures therein, of means for delivering liquid to said receptacles, means for regulating the rate of flow thereto in proportion to and in accordance with the velocity head in the supply pipe, and means for maintaining the liquid delivered to said receptacles at equal levels.

In testimony whereof, I have hereunto subscribed my name this 25th day of April, 1930.

EMIL G. DUDEN.